(12) United States Patent
Araki

(10) Patent No.: US 10,407,000 B2
(45) Date of Patent: Sep. 10, 2019

(54) STRUCTURE FOR PROTECTING AN ELECTRIC WIRE CONNECTION AND A WIRE HARNESS

(71) Applicant: Sumitomo Wiring Systems, Ltd., Yokkaichi, Mie (JP)

(72) Inventor: Yusuke Araki, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 178 days.

(21) Appl. No.: 15/784,664

(22) Filed: Oct. 16, 2017

(65) Prior Publication Data

US 2018/0134237 A1 May 17, 2018

(30) Foreign Application Priority Data

Nov. 11, 2016 (JP) .................... 2016-220258

(51) Int. Cl.
| | | |
|---|---|---|
| *B60R 16/02* | (2006.01) | |
| *H01R 4/02* | (2006.01) | |
| *H01B 7/00* | (2006.01) | |
| *H02G 3/04* | (2006.01) | |
| *H01R 4/72* | (2006.01) | |
| *H02G 15/18* | (2006.01) | |

(52) U.S. Cl.
CPC ....... *B60R 16/0215* (2013.01); *H01B 7/0009* (2013.01); *H01B 7/0045* (2013.01); *H01R 4/021* (2013.01); *H01R 4/72* (2013.01); *H02G 3/0462* (2013.01); *H02G 15/1806* (2013.01)

(58) Field of Classification Search
CPC .......... H01R 4/72; H01R 4/723; H01R 4/736; H02G 15/1806
See application file for complete search history.

(56) References Cited

U.S. PATENT DOCUMENTS

| | | | |
|---|---|---|---|
| 6,376,773 B1 * | 4/2002 | Maegawa | H01R 12/63 174/117 F |
| 8,936,187 B2 * | 1/2015 | Hino | H01R 43/02 228/112.1 |
| 2009/0181583 A1 * | 7/2009 | Krabs | H01R 4/726 439/738 |
| 2009/0218135 A1 * | 9/2009 | Vallauri | H02G 15/103 174/88 C |

(Continued)

FOREIGN PATENT DOCUMENTS

JP 2016058137 A 4/2016

*Primary Examiner* — Hoa C Nguyen
*Assistant Examiner* — Amol H Patel
(74) *Attorney, Agent, or Firm* — Reising Ethington, P.C.

(57) ABSTRACT

A wire harness that comprises a connecting portion in which a first conductor exposed at a terminal portion of the first wire by stripping an insulating coating therefrom is connected to a second conductor exposed at a terminal portion of a second wire by stripping an insulating coating therefrom, the second wire having a higher flexibility than the first wire. The wire harness also comprises two layers of shrinkable tubes fitted around the outer circumference of the connecting portion. According to this structure, even if one of the shrinkable tubes is torn, the other shrinkable tube can provide protection to the connecting portion, thus improving the durability of the connecting portion.

7 Claims, 4 Drawing Sheets

(56) References Cited

U.S. PATENT DOCUMENTS

| | | | |
|---|---|---|---|
| 2013/0199841 A1* | 8/2013 | Lehmann | H01R 4/187 174/75 R |
| 2014/0338953 A1* | 11/2014 | Seraj | H01R 4/70 174/138 F |
| 2016/0071630 A1 | 3/2016 | Sugino | |

* cited by examiner

STRUCTURE FOR PROTECTING AN ELECTRIC WIRE CONNECTION AND A WIRE HARNESS

CROSS REFERENCE TO RELATED APPLICATIONS

This application claims the priority of Japanese patent application JP2016-220258 filed on Nov. 11, 2016, the entire contents of which are incorporated herein.

TECHNICAL FIELD

The present invention relates to a structure for protecting an electric wire connection and a wire harness in which the structure is employed.

BACKGROUND ART

Wire harnesses mounted on board of vehicles, such as hybrid cars and electric cars, have been conventionally known in which electric wires having different flexibilities, such as single-core wires and stranded wires, are connected to one another. For example, JP 2016-58137A describes a wire harness in which single-core wires are connected to stranded wires such that, when mounted in a vehicle, the single-core wires are used in the regions where no flexibility is required and the stranded wires are used in the regions where flexibility is required for connection with pieces of equipment. The conductor exposed at a terminal portion of each single-core wire by stripping the insulating coating therefrom is placed on the conductor exposed at a terminal portion of a stranded wire by stripping the insulating coating therefrom in a direction transverse direction to the direction in which both wires extend, and the single-core wire and the stranded wire are connected by ultrasonic welding. A shrinkable tube is fitted on or covers the connecting portion to ensure electrical insulation.

JP 2016-58137A is an example of related art.

SUMMARY OF THE INVENTION

According to the foregoing structure, however, if the flexible wires are subjected to repeated deflection, the shrinkable tubes on these wires may be torn from their ends, or the edges of the connecting portions may tear or otherwise damage the shrinkable tubes. Accordingly, there has been a need for improving the durability of such shrinkable tubes.

The present design has been made in the light of the above-described circumstances and its object is to provide a structure for protecting an electric wire connection and a wire harness that can improve the durability of the connection.

The present design is directed to a structure for protecting an electric wire connection, comprising: a connecting portion in which a conductor exposed at a terminal portion of a first wire by stripping an insulating coating therefrom is connected to a conductor exposed at a terminal portion of a second wire by stripping an insulating coating therefrom; and two layers of shrinkable tubes fitted on an outer circumference of the connecting portion.

The present design is also directed to a wire harness that comprises: a first wire; a second wire having a higher flexibility than the first wire; a connecting portion in which the first wire and the second wire are connected to each other; and the above-described structure for connecting electric wires.

According to the present design, even if one of the shrinkable tubes is torn, the other shrinkable tube can provide protection to the connecting portion, thus improving the durability of the connecting portion.

EMBODIMENTS OF THE INVENTION

Figure 1:
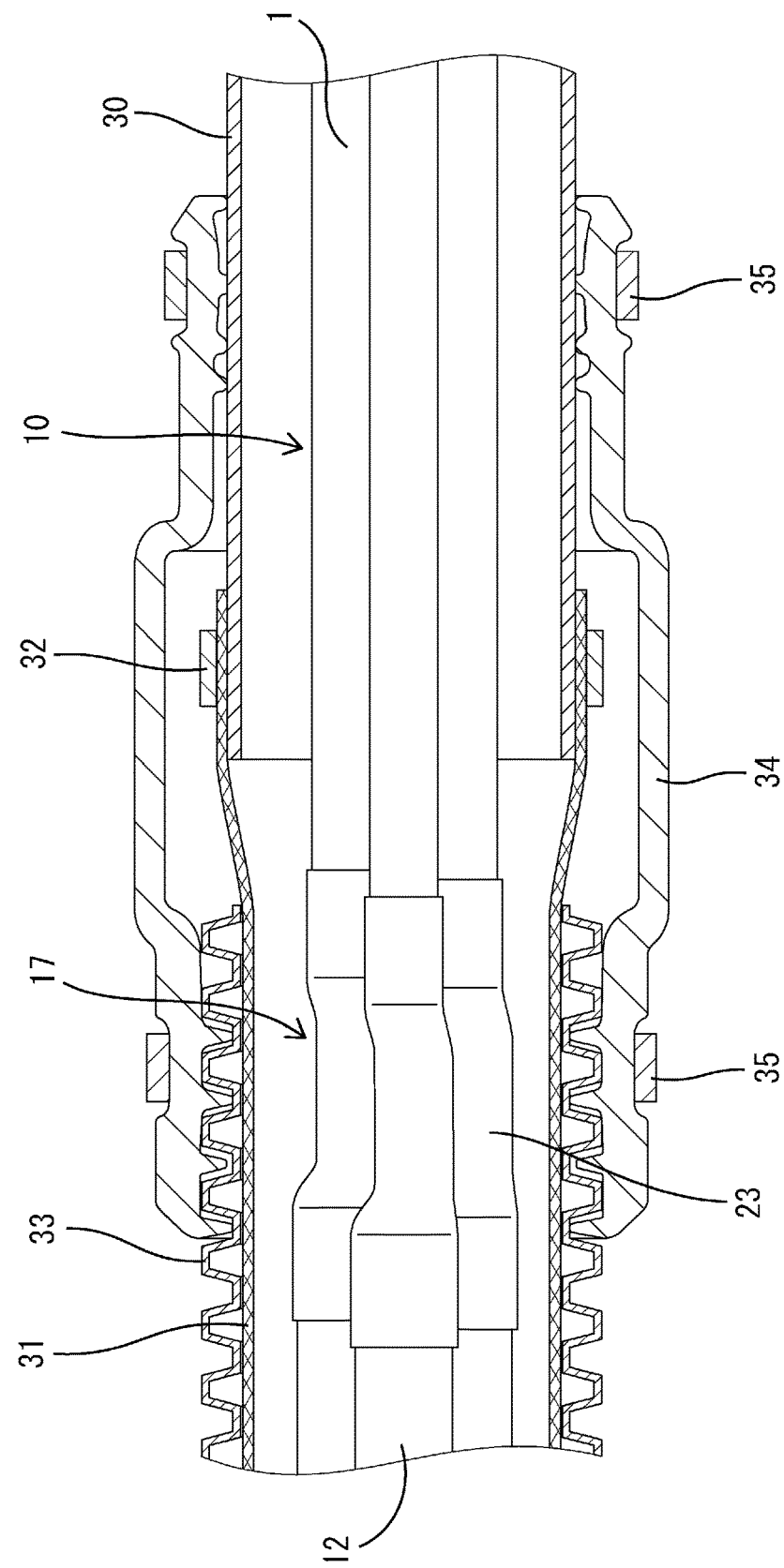
FIG. 1 is a cross-sectional view of the wire harness of Embodiment 1, enlarging the vicinity of the wire connection.
Figure 2:
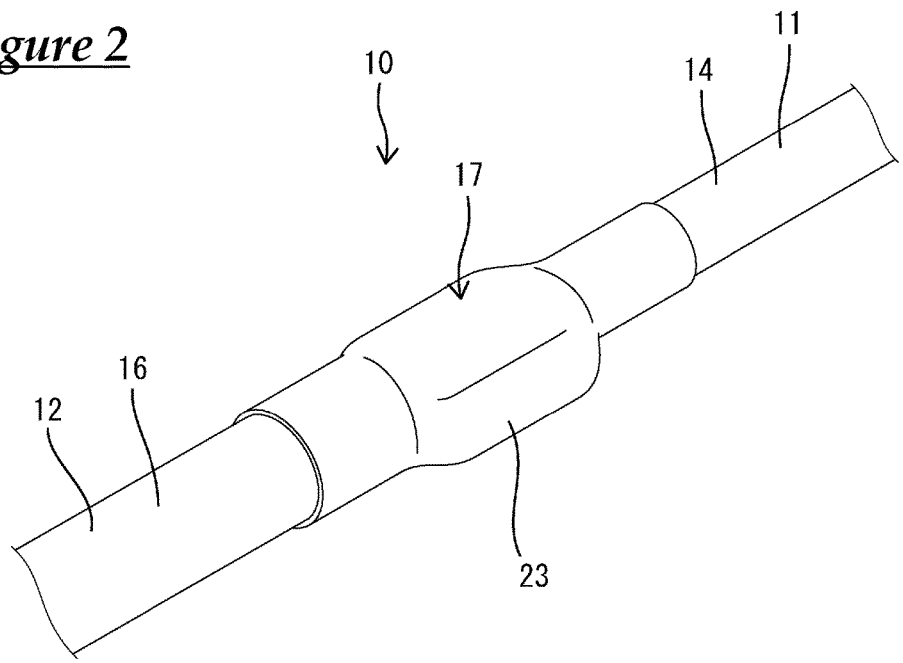
FIG. 2 is a perspective view showing the wire connection.

Preferred embodiments will be described hereinafter.

In the structure for protecting an electric wire connection according to the present design, the internally fitted one of the shrinkable tubes has a different length and different heat resistant properties from those of the externally fitted one of the shrinkable tubes. Accordingly, the heat resistant properties can be cost-effectively maximized if the shrinkable tube with relatively high heat resistant properties has a smaller length than the shrinkable tube with relatively low heat resistant properties. Generally, the prices of heat shrinkable tubes increase in proportion to their heat resistant properties. Therefore, the heat resistant properties of the connecting portion can be cost-effectively maximized by making the shrinkable tube with relatively high heat resistant properties, i.e., the more expensive shrinkable tube, shorter than the shrinkable tube with relatively low heat resistant properties, i.e., the less expensive shrinkable tube.

In the structure for protecting an electric wire connection according to the present design, axial ends of the internally fitted one of the shrinkable tubes are exposed to outside without being covered by axial ends of the externally fitted one of the shrinkable tubes. According to this structure, it is possible to visually confirm that the two layers of shrinkable tubes are fitted with one placed on the other, thereby facilitating the prevention of inadvertent omission of installing the inner shrinkable tube.

Embodiment 1

One embodiment of the present design will be described in detail hereinafter with reference to FIGS. 1-4.

The wire harness according to this embodiment is mounted on board of vehicles, such as hybrid cars, by being connected between pieces of equipment installed in the front of the vehicle and pieces of equipment installed in the rear of the vehicle. The wire harness of this embodiment includes a plurality (three in this embodiment) of conductive wires 10.

All the conductive wires 10 are passed through a shield pipe 30 mounted on the underside of the floor of the vehicle. Most of the shield pipe 30 extends longitudinally along the underside of the vehicle floor with the front and rear ends of the shield pipe 30 disposed in the cabin. The shield pipe 30 is an elongated piece of a piping material made of metal (for example, aluminum or aluminum alloy). The shield pipe 30 has a circular cross section and is bent to conform to the predetermined piping route.

A braided member 31 is connected to each of the front and rear ends of the shield pipe 30 so that the entire length of the conductive wires 10 is shielded from noise by being surrounded by the shield pipe 30 or the braided members 31. Each braided member 31 is made of conductive metal elemental wires braided into a tube and has an excellent flexibility. The braided member 31 is crimped to the ends of the shield pipe 30 with a crimping ring 32.

The braided member 31 is surrounded and protected by an outer jacket 33 that has an excellent flexibility. The outer jacket 33 can be formed, for example, from a corrugated tube made of a synthetic resin.

A grommet 34 is mounted on the wire harness, spanning the outer jacket 33 and the shield pipe 30. The grommet 34 is made of a rubber material formed into a tube with one end thereof in intimate contact with the shield pipe 30 and the other end thereof also in intimate contact with the outer jacket 33. The grommet 34 is secured to the shield pipe 30 and the outer jacket 33 by tightening fastener members 35, such as tie bands, on the grommet 34.

The conductive wire 10 includes a first wire 11 and a second wire 12 having a higher flexibility than, and connected to, the first wire 11 in the longitudinal direction thereof.

The first wire 11 is a single-core wire made of a single metal rod or core (hereinafter referred to as the first conductor 13) surrounded with an insulating coating 14. The first conductor 13 is made of aluminum or aluminum alloy formed to have a circular cross section.

The second wire 12 is a stranded wire that comprises a stranded conductor made of a plurality of stranded elemental metal wires (hereinafter referred to as the second conductor 15) surrounded with an insulating coating 16. The second conductor 15 is made of aluminum or aluminum alloy. The second wire 12 has an outer diameter that is greater than that of the first wire 11.

Figure 3:
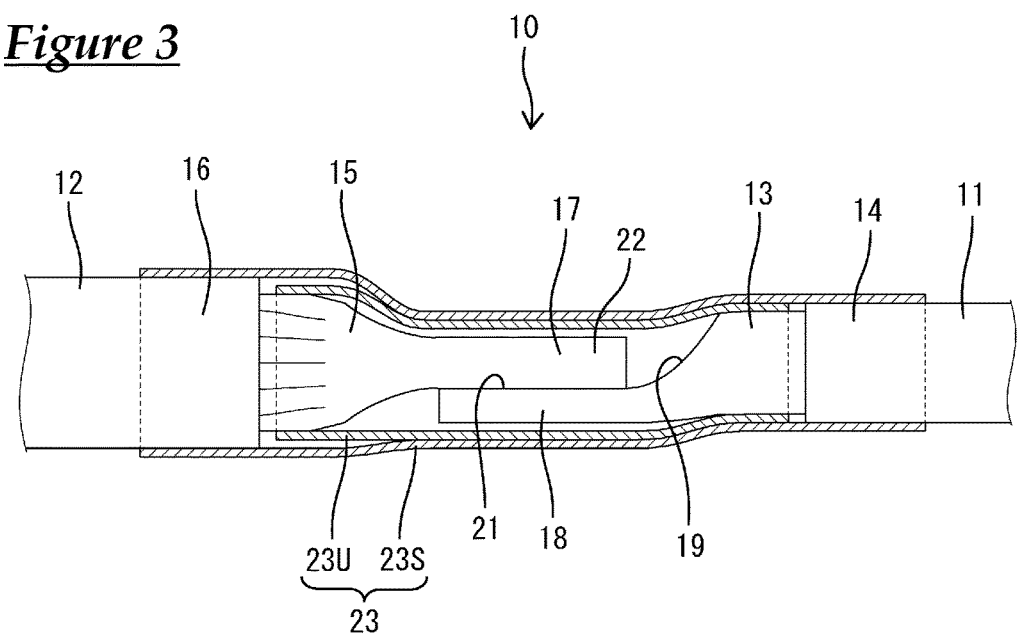
FIG. 3 is a side cross-sectional view showing the wire connection.

As shown in FIG. 3, the conductive wire 10 has a connecting portion 17 in which the first conductor 13 exposed at a terminal portion of the first wire 11 by stripping the insulating coating 14 therefrom is connected to the second conductor 15 exposed at a terminal portion of the second wire 12 by stripping the insulating coating 16 therefrom. The first conductor 13 and the second conductor 15 are connected to each other by placing one conductor on the other in a direction transverse to the direction in which the first and second wires 11 and 12 extend. As shown in FIG. 1, when the conductive wires 10 are inserted in the shield pipe 30, the connecting portions 17 are located at predetermined distances outward from the end face of the shield pipe 30, i.e., disposed within the braided member 31.

As shown in FIG. 3, a crushed portion 18 that is crushed into a tubular shape is formed on the exposed terminal portion of the first conductor 13. The crushed portion 18 is diametrically pressed to one side of the first conductor 13, positioning the entire crushed portion 18 on one side of the centerline of the first conductor 13. The crushed portion 18 extends in approximate parallel to the axis of the first conductor 13.

Figure 4:
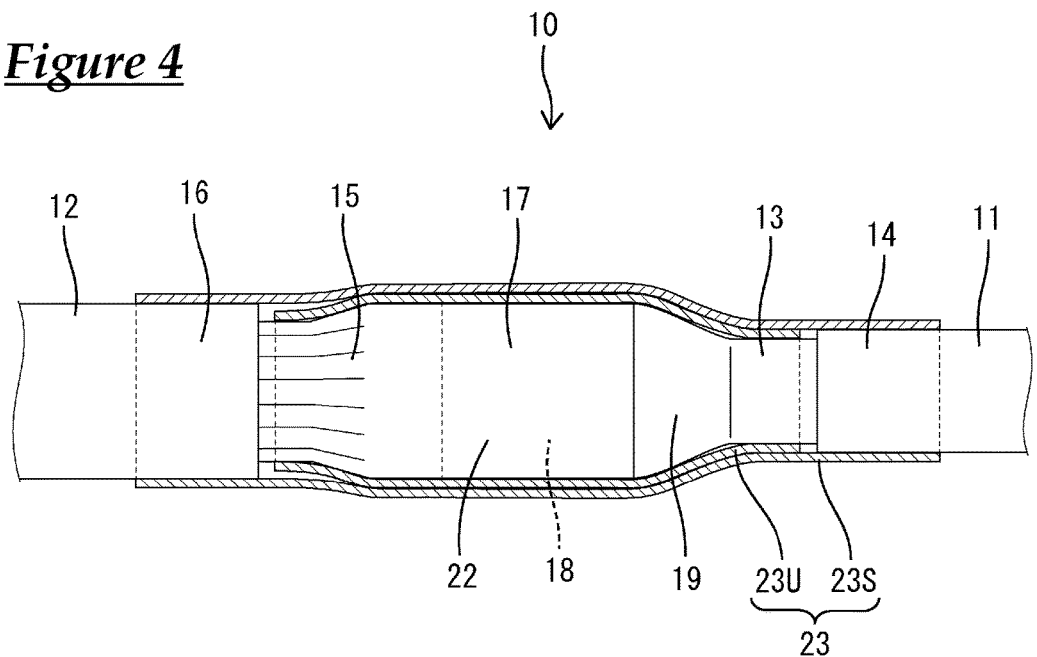
FIG. 4 is a plane cross-sectional view showing the wire connection.

As shown in FIG. 4, the width of the crushed portion 18 is made larger than the widths of any other portions of the first conductor 13. That is, the crushed portion 18 is crushed to expand lengthwise and also widthwise from both sides of the first conductor 13.

As shown in FIG. 3, the crushed portion 18 forms a stepped portion 19 in the exposed terminal portion of the first conductor 13. The stepped portion 19 has a step height that is larger than approximately half of the diameter of the first conductor 13. The surface of the crushed portion 18 located on the same side as the stepped portion 19 serves as a connecting surface 21 for connection with the second conductor 15. The connecting surface 21 is a planar surface.

The elemental wires are welded together at the exposed terminal portion of the second conductor 15 to form a block portion 22. The block portion 22 is formed into a shape of a flat and approximate rectangular solid. The height of the block portion 22 (the vertical dimension as shown in FIG. 3) is made smaller than the diameters of any other portions of the second conductor 15. The width of the block portion 22 (the vertical dimension as shown in FIG. 4) is made slightly greater than those of any other portions of the second conductor 15. The longitudinal dimension of the block portion 22 is equal to that of the crushed portion 18 and the widthwise dimension of the block portion 22 is also equal to that of the crushed portion 18. The block portion 22 is located at the diametrical center of the second conductor 15 with stepped portions formed on the upper and lower sides of the block portion 22 in the vertical direction thereof.

The block portion 22 of the second conductor 15 is placed on the connecting surface 21 of the first conductor 13 and connected to the first conductor 13, for example, with an ultrasonic bonding machine. This ultrasonic welding provides a metal-to-metal connection between the contact portions of the first conductor 13 and the second conductor 15 so as to establish an electrical connection between the first conductor 13 and the second conductor 15. With the crushed portion 18 and the block portion 22 connected to each other, the center axis of the first wire 11 and that of the second wire 12 are approximately coaxially aligned with each other.

Two layers of shrinkable tubes 23 are fitted on or cover the outer circumference of the connecting portion 17. Both of the shrinkable tubes 23 are heat-shrinkable tubes. Of the two shrinkable tubes 23, the inner shrinkable tube or internally fitted tube 23U has a different length and different heat resistant properties from those of the outer shrinkable tube or externally fitted tube 23S.

The inner shrinkable tube 23U has a smaller length than the outer shrinkable tube 23S. The inner shrinkable tube 23U has a sufficient length to surround at least the entire overlap between the crushed portion 18 of the first conductor 13 and the block portion 22 of the second conductor 15 while having a smaller length than the entire length of the exposed portions of the first conductor 13 and the second conductor 15. With the inner shrinkable tube 23U fitted around the connecting portion 17, neither end of the inner shrinkable tube 23U reaches the insulating coating 14 of the first wire 11 or the insulating coating 16 of the second wire 12.

The inner shrinkable tube 23U has a higher heat-resistant temperature than the outer shrinkable tube 23S. In this embodiment, the inner shrinkable tube 23U has a heat-resistant temperature of about 150° C. (degrees Celsius) while the outer shrinkable tube 23S has a heat-resistant temperature of about 120° C. (degrees Celsius). In other words, according to this embodiment, the inner shrinkable tube 23U, which has relatively high heat resistant properties, has a smaller length than the outer shrinkable tube 23S, which has relatively low heat resistant properties.

The outer shrinkable tube 23S has a sufficient length to cover the entire length of the inner shrinkable tube 23U. With the outer shrinkable tube 23S fitted around the connecting portion 17, both ends of the outer shrinkable tube 23S are fitted on the respective ends of the insulating coating 14 of the first wire 11 and the insulating coating 16 of the second wire 12. The inner shrinkable tube 23U is positioned on the axial center of the outer shrinkable tube 23S so that the portion of the outer shrinkable tube 23S that does not overlap the inner shrinkable tube 23U (where there is a single layer of a shrinkable tube 23) on the first wire 11 side is as long as that on the second wire 12 side.

Next, the effect of this embodiment configured as described above will be described.

The wire harness of this embodiment includes a connecting portion 17 in which the first conductor 13 exposed at a terminal portion of the first wire 11 by stripping the insulating coating 14 therefrom is connected to the second conductor 15 exposed at a terminal portion of the second wire 12 by stripping the insulating coating 16 therefrom, the second wire 12 having a higher flexibility than does the first wire 11. The wire harness also includes two layers of shrinkable tubes 23 fitted around the outer circumference of the connecting portion 17. According to this structure, even if the inner shrinkable tube 23U is torn by an edge of the first conductor 13 or an edge of the second conductor 15 in the connecting portion 17, the outer shrinkable tube 23S continues to protect the connecting portion 17, thus improving the durability of the connecting portion 17. That is, compared with a case where only a single layer of shrinkable tube 23 is used, the insulating performance can be maintained because a greater degree of protection is provided to the connecting portion 17.

Moreover, of the two shrinkable tubes 23, the inner shrinkable tube 23U or the internally fitted tube has a different length and different heat resistant properties from those of the outer shrinkable tube 23S or the externally fitted tube; specifically, the inner shrinkable tube 23U, which has a relatively high heat resistant properties, has a smaller length than the outer shrinkable tube 23S, which has a relatively low heat resistant properties. Generally, the prices of heat shrinkable tubes increase in proportion to their heat resistant properties. Therefore, the heat resistant properties of the connecting portion can be cost-effectively maximized by making the inner shrinkable tube 23U (which has relatively high heat resistant properties, i.e., the more expensive shrinkable tube) shorter than the outer shrinkable tube 23S (which has relatively low heat resistant properties, i.e., the less expensive shrinkable tube).

Furthermore, in the connecting portion 17, as the first conductor 13 and the second conductor 15 are placed on and connected to each other in a direction transverse to the direction in which the first and second wires 11 and 12 extend, the above-described connection of the electric wires is robust against forces exerted in the direction in which the wires 11 and 12 extend, but it tends to be vulnerable to forces transversal to the direction in which the wires (i.e., "peeling force") extend. Moreover, as the second wire 12 easily deflects due to its high flexibility, a peeling force tends to be applied to the connecting portion 17 as a result of a deflection of the second wire 12, which may in turn result in peeling in the connecting portion 17. One possible preventive measure against such peeling in the connecting portion 17 is to contain the connecting portion 17 in a less bendable, harder tube. One drawback of this solution is that it would require wrapping a tape around the connecting portion. In this embodiment, as the strength of the connecting portion 17 is increased by fitting two layers of shrinkable tubes 23 thereon, peeling in the connecting portion 17 as described above can be prevented while also saving the labor for tape wrapping. In addition, the shrinkable tubes 23 can improve the durability of the connecting portion as they have higher heat resistant properties than other types of outer jacket members made of resin, such as hard tubes.

Embodiment 2

Figure 5:
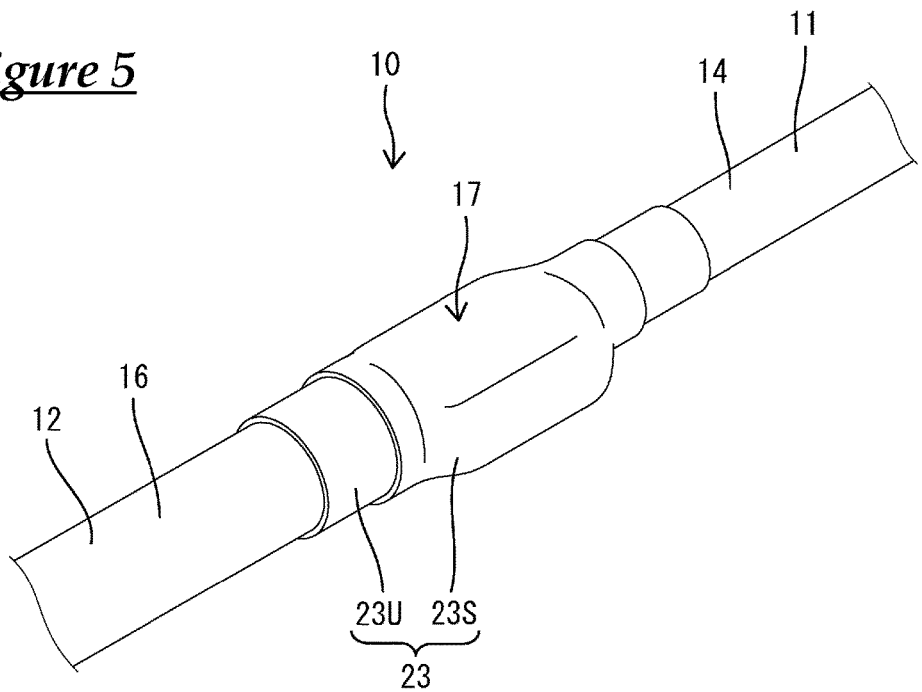
FIG. 5 is a perspective view showing the wire connection according to Embodiment 2.
Figure 6:
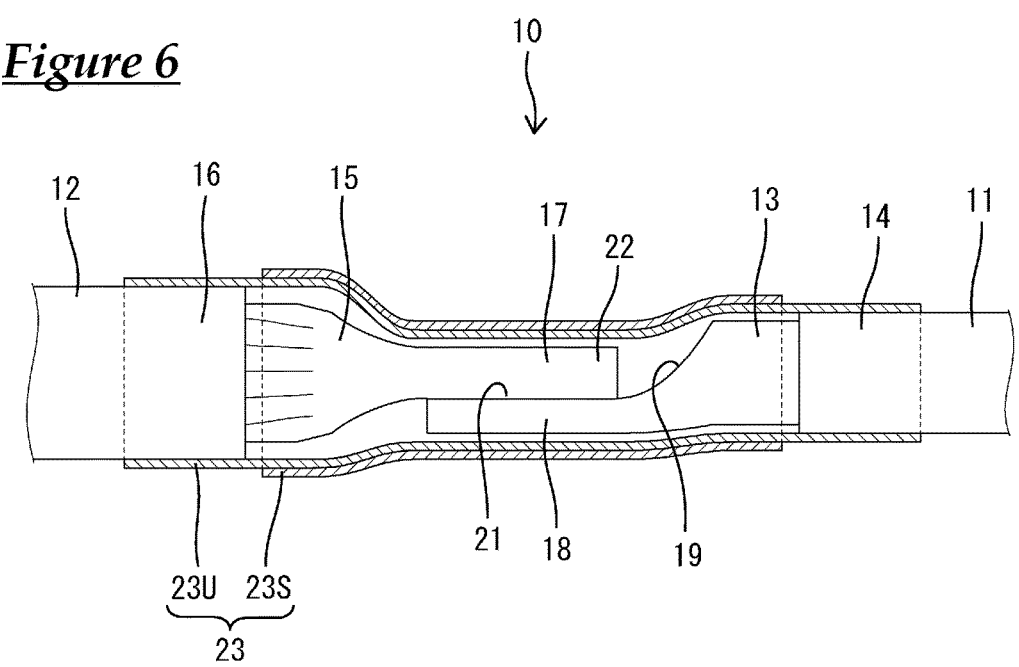
FIG. 6 is a side cross-sectional view showing the wire connection.

A wire harness of Embodiment 2 according to the present design will be described hereinafter with reference to FIGS. 5 and 6.

The wire harness of this embodiment differs from the wire harness of Embodiment 1 in that the axial ends of the inner shrinkable tube 23U are exposed to the outside rather than being covered by the axial ends of the outer shrinkable tube 23S. Note that components identical to those described with respect to Embodiment 1 are assigned identical designations and their further description is omitted herein.

As in Embodiment 1, the wire harness of this embodiment includes a connecting portion 17 in which the first conductor 13 exposed at a terminal portion of the first wire 11 by stripping the insulating coating 14 therefrom is connected to the second conductor 15 exposed at a terminal portion of the second wire 12 by stripping the insulating coating 16 therefrom, the second wire 12 having a higher flexibility than the first wire 11. The wire harness also includes two layers of shrinkable tubes 23 fitted around the outer circumference of the connecting portion 17. As in Embodiment 1, both of the shrinkable tubes 23 are heat-shrinkable tubes with the inner shrinkable tube 23U having a different length and different heat resistant properties from those of the outer shrinkable tube 23S.

In this embodiment, the inner shrinkable tube 23U is made longer than the outer shrinkable tube 23S. The inner shrinkable tube 23U has a sufficient length to cover the entire length of the exposed portions of the first conductor 13 and the second conductor 15, and, with the inner shrinkable tube 23U fitted around the connecting portion 17, both ends of the inner shrinkable tube 23U are fitted on the respective ends of the insulating coating 14 of the first wire 11 and the insulating coating 16 of the second wire 12.

The outer shrinkable tube 23S has a sufficient length to surround at least the entire overlap between the crushed portion 18 of the first conductor 13 and the block portion 22 of the second conductor 15 while having a smaller length than the entire length of the exposed portions of the first conductor 13 and the second conductor 15. With the outer shrinkable tube 23S fitted around the connecting portion 17, neither end of the outer shrinkable tube 23S reaches the insulating coating 14 of the first wire 11 or the insulating coating 16 of the second wire 12.

The outer shrinkable tube 23S is positioned on the axial center of the inner shrinkable tube 23U such that the axial ends of the inner shrinkable tube 23U are exposed to the outside rather than being covered by the axial ends of the outer shrinkable tube 23S. Both ends of the inner shrinkable tube 23U, i.e., those on the first wire 11 side and the second wire 12 side, (where the inner shrinkable tube 23U is not covered by the outer shrinkable tube 23S) have approximately the same length.

The outer shrinkable tube 23S has a higher heat-resistant temperature than the inner shrinkable tube 23U. In this embodiment, the outer shrinkable tube 23S has a heat-resistant temperature of about 150° C. (degrees Celsius) while the inner shrinkable tube 23U has a heat-resistant temperature of about 120° C. (degrees Celsius). In other words, according to this embodiment, the outer shrinkable tube 23S, which has relatively high heat resistant properties, has a smaller length than the inner shrinkable tube 23U, which has relatively low heat resistant properties.

As described above, according to this embodiment, as in Embodiment 1, as the two layers of shrinkable tubes 23 are wrapped or fitted around the outer circumference of the connecting portion 17 between the first conductor 13 and the second conductor 15, the durability of the connecting portion 17 can be improved. Furthermore, the axial ends of the inner shrinkable tube 23U are exposed to the outside rather than being covered by the axial ends of the outer shrinkable tube 23S. Accordingly, it is possible to visually confirm that the two layers of shrinkable tubes 23 are fitted with one placed on the other, thereby facilitating the prevention of inadvertent omission of installing the inner shrinkable tube 23U.

Other Embodiments

The present invention is not limited to the embodiments described in the above description and the drawings. For example, other embodiments, which will be described below, also fall under the technical scope of the present invention.

In the foregoing embodiments, the first conductor 13 and the second conductor 15 are connected to each other by placing one of the conductors on the other in a direction transverse to the direction in which the first and second wires 11 and 12 extend. However, the present invention is not limited to this and the structure for connecting the first conductor and the second conductor can be modified to suit any application. For example, the first conductor and the second conductor may be connected by bringing their axial end faces into abutment against each other.

In the foregoing embodiments, although two shrinkable tubes 23 are fitted around each connecting portion, the present invention is not limited to this. Three or more shrinkable tubes may be fitted to provide triple or more layers of tubes.

In the foregoing embodiments, although a crushed portion 18 is formed on the first conductor 13 with a block portion 22 formed on the second conductor 15, the present invention is not limited to this. For example, the first and second conductor may be connected to each other without forming a crushed portion or a block portion.

In the foregoing embodiments, although heat-shrinkable tubes are used as the shrinkable tubes 23, the present invention is not limited to this. For example, room-temperature shrinkable tubes can be used as the shrinkable tubes.

In the foregoing embodiments, although the first conductor 13 is made of a single metal rod and the second conductor 15 is made of a stranded plurality of metal elemental wires, the present invention is not limited to this. For example, the first conductor may be made of a metal pipe and/or the second conductor may also be a braided wire formed by weaving a large number of elemental metal wires.

In the foregoing embodiments, exemplary heat-resistant temperatures have been discussed in connection with the inner shrinkable tube 23U and the outer shrinkable tube 23S. However, the present invention is not limited to this. For example, shrinkable tubes with any heat-resistant temperatures may be also be used.

According to Embodiment 1 above, the inner shrinkable tube 23U has a higher heat-resistant temperature than the outer shrinkable tube 23S. Alternatively and conversely, the outer shrinkable tube may have a higher heat-resistant temperature than the inner shrinkable tube as a measure against environmental heat damage.

According to Embodiment 2 above, the inner shrinkable tube 23U is longer than the outer shrinkable tube 23S so as to expose both ends of the inner shrinkable tube 23U to the outside. However, the present invention is not limited to this. For example, the inner and outer shrinkable tubes may also have the same length so that one end of the inner shrinkable tube can be exposed by axially displacing the two tubes when fitted on the connecting portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 First wire
12 Second wire
13 First conductor (Conductor)
14 Insulating coating
15 Second conductor (Conductor)
16 Insulating coating
17 Connecting portion
23 Shrinkable tube
23U Inner shrinkable tube
23S Outer shrinkable tube

What is claimed is:
1. A structure for protecting an electric wire connection, comprising:
a connecting portion in which a conductor exposed at a terminal portion of a first wire by stripping an insulating coating therefrom is connected to a conductor exposed at a terminal portion of a second wire by stripping an insulating coating therefrom, the second wire having higher flexibility than the first wire; and
two layers of shrinkable tubes fitted on an outer circumference of the connecting portion,
wherein an internally fitted one of the shrinkable tubes has a different length and different heat resistant properties from those of an externally fitted one of the shrinkable tubes.
2. A wire harness comprising:
a first wire;
a second wire having a higher flexibility than the first wire;
a connecting portion connecting the first wire and the second wire to each other;

and the structure for protecting an electric wire connection according to claim 1.

3. A structure for protecting an electric wire connection, comprising:
- a connecting portion in which a conductor exposed at a terminal portion of a first wire by stripping an insulating coating therefrom is connected to a conductor exposed at a terminal portion of a second wire by stripping an insulating coating therefrom, the second wire having higher flexibility than the first wire; and
- two layers of shrinkable tubes fitted on an outer circumference of the connecting portion,
- wherein axial ends of an internally fitted one of the shrinkable tubes are exposed to outside and not covered by axial ends of an externally fitted one of the shrinkable tubes.

4. A wire harness comprising:
- a first wire;
- a second wire having a higher flexibility than the first wire;
- a connecting portion connecting the first wire and the second wire to each other; and
- the structure for protecting an electric wire connection according to claim 3.

5. A structure for protecting an electric wire connection, comprising:
- a connecting portion in which a first end of a conductor exposed at a terminal portion of a first wire by stripping an insulating coating therefrom is connected to a second end of a conductor exposed at a terminal portion of a second wire by stripping an insulating coating therefrom, the second wire having higher flexibility than the first wire, the connecting portion including an overlap in which the first and second ends are overlapped; and
- two layers of shrinkable tubes fitted on an outer circumference of the connecting portion, wherein the two layers of shrinkable tubes cover the overlap of the first and second ends, wherein the internally fitted one of the shrinkable tubes has a different length and different heat resistant properties from those of the externally fitted one of the shrinkable tubes.

6. The structure for protecting an electric wire connection according to claim 5, wherein axial ends of the internally fitted one of the shrinkable tubes are exposed to outside and are not covered by axial ends of the externally fitted one of the shrinkable tubes.

7. A wire harness comprising:
- a first wire;
- a second wire having a higher flexibility than the first wire;
- a connecting portion connecting the first wire and the second wire to each other; and
- the structure for protecting an electric wire connection according to claim 5.

* * * * *